(12) United States Patent
Ohtomo et al.

(10) Patent No.: US 10,895,632 B2
(45) Date of Patent: Jan. 19, 2021

(54) SURVEYING SYSTEM

(71) Applicant: TOPCON Corporation, Tokyo-to (JP)

(72) Inventors: Fumio Ohtomo, Saitama (JP); Kaoru Kumagai, Tokyo-to (JP); Nobuyuki Nishita, Tokyo-to (JP)

(73) Assignee: TOPCON Corporation, Tokyo (JP)

( * ) Notice: Subject to any disclaimer, the term of this patent is extended or adjusted under 35 U.S.C. 154(b) by 334 days.

(21) Appl. No.: 15/968,913

(22) Filed: May 2, 2018

(65) Prior Publication Data

US 2018/0329041 A1 Nov. 15, 2018

(30) Foreign Application Priority Data

May 10, 2017 (JP) .................................. 2017-093802

(51) Int. Cl.
*G01S 7/48* (2006.01)
*G01S 7/481* (2006.01)
(Continued)

(52) U.S. Cl.
CPC .......... *G01S 7/4817* (2013.01); *G01C 15/002* (2013.01); *G01C 15/06* (2013.01); *G01S 17/42* (2013.01)

(58) Field of Classification Search
CPC . G01C 11/04; G01C 1/04; G01C 3/08; G01C 15/002; G06T 7/70; G06T 7/74; G06T 2207/10028; G06T 2207/30204
See application file for complete search history.

(56) References Cited

U.S. PATENT DOCUMENTS 6,023,326 A   2/2000 Katayama et al.
6,683,693 B1  1/2004 Tsuka et al.
(Continued)

FOREIGN PATENT DOCUMENTS

DE  112014000971 T5  11/2015
JP  2016-151422 A    8/2016
JP  2016-151423 A    8/2016

OTHER PUBLICATIONS

European communication dated Oct. 10, 2018 in corresponding European patent application No. 18170804.1.
(Continued)

*Primary Examiner* — Luke D Ratcliffe
(74) *Attorney, Agent, or Firm* — Nields, Lemack & Frame, LLC

(57) ABSTRACT

A target instrument has an object to be measured which is provided with a reflection sheet, wherein the total station has a distance measuring light projecting unit, a light receiving unit, a distance measuring unit for performing a distance measurement of an object to be measured, an optical axis deflector capable of deflecting the distance measuring optical axis two-dimensionally, a projecting direction detecting module for detecting a deflection angle of the distance measuring optical axis and performing an angle measurement, and an arithmetic control module for controlling the optical axis deflector and the distance measuring unit, wherein the arithmetic control module is configured to two-dimensionally scan the object to be measured with the distance measuring light and to perform a distance measurement and an angle measurement with respect to the object to be measured, and further to detect a tilt and a tilt direction of the target instrument.

18 Claims, 11 Drawing Sheets

(51) Int. Cl.
*G01C 15/00* (2006.01)
*G01C 15/06* (2006.01)
*G01S 17/42* (2006.01)

(56) References Cited

U.S. PATENT DOCUMENTS

| | | |
|---|---|---|
| 2004/0223139 A1 | 11/2004 | Vogel |
| 2010/0026982 A1* | 2/2010 | Kludas .................. G01C 15/00 356/4.01 |
| 2012/0272536 A1 | 11/2012 | Nishita |
| 2016/0238385 A1 | 8/2016 | Ohtomo et al. |
| 2016/0238708 A1* | 8/2016 | Ohtomo .................. G01C 9/06 |
| 2017/0167870 A1* | 6/2017 | Nishita .................. G01C 11/04 |
| 2018/0329040 A1 | 11/2018 | Ohtomo et al. |

OTHER PUBLICATIONS

Office action dated Jun. 15, 2020 in co-pending U.S. Appl. No. 15/968,881.

Notice of allowance dated Nov. 9, 2020 in co-pending U.S. Appl. No. 15/968,881.

* cited by examiner

SURVEYING SYSTEM

BACKGROUND OF THE INVENTION

The present invention relates to a surveying system which sights an object to be measured and measures the object to be measured.

In general, in order to perform a survey, an object to be measured, e.g. a retro-reflective prism (a corner cube) as the object to be measured for instance, is installed at a measuring point, the corner cube is sighted from a total station installed at a known point, a distance to the corner cube and a horizontal angle and a vertical angle with respect to the known direction of a sighting direction, and obtains a horizontal distance and a horizontal angle to the corner cube and the vertical height of the corner cube.

At this time, the installation of the corner cube needs to be moved frequently according to the number of measuring points. Thus, as a purpose of simplifying the installation, a method is adopted in which the corner cube is attached to a pole and the pole is installed vertically so as to indicate the measuring point with the lower end of the pole.

In a case where the corner cube is attached to the pole, since there is distance between the corner cube and the lower end of the pole, an error in the horizontal distance occurs in a case where the pole is not set up vertical with respect to the measuring point when the pole is installed. For this reason, a bubble tube for detecting a verticality is normally attached to the pole and the pole is set up vertically using the bubble tube.

However, while this method works when the position of the measuring point is located at a place where the pole can be set up vertically, in a case of an object or a building, when measuring in a corner or the like for instance, the measuring point is measured indirectly by installing the pole at a position deviated from the measuring point, measuring the position deviated from the measuring point, and measuring the deviated distance using a different method. It was not possible to perform a direct measurement at places where the pole cannot be set up vertically, such as a position and the like on a wall surface of a building.

SUMMARY OF THE INVENTION

It is an object of the present invention to provide a surveying system which can measure a measuring point directly regardless of a posture of a member supporting an object to be measured.

To attain the object as described above, a surveying system according to the present invention is a surveying system comprising: a total station and a target instrument, wherein the target instrument has an object to be measured which is provided with a reflection sheet as a retro-reflector, wherein the total station has a distance measuring light projecting unit for projecting a distance measuring light, a light receiving unit for receiving a reflected distance measuring light and producing a light receiving signal, a distance measuring unit for performing a distance measurement of an object to be measured based on the light receiving signal, an optical axis deflector provided on a distance measuring optical axis and capable of deflecting the distance measuring optical axis two-dimensionally, a projecting direction detecting module for detecting a deflection angle of the distance measuring optical axis and performing an angle measurement, and an arithmetic control module for controlling a deflecting action of the optical axis deflector and a distance measuring action of the distance measuring unit, wherein the arithmetic control module is configured to two-dimensionally scan the object to be measured with the distance measuring light by using the optical axis deflector and to perform a distance measurement and an angle measurement with respect to the object to be measured, and further to detect a tilt and a tilt direction of the target instrument based on two or more results of distance measurement and angle measurement.

Further, in the surveying system according to a preferred embodiment, the optical axis deflector comprises a pair of optical prisms rotatable around the distance measuring optical axis as a center and motors individually rotating the optical prisms independently, wherein the arithmetic control module is configured to control a rotating direction, a rotating speed and a rotation ratio of the pair of optical prisms and to control a deflection by the optical axis deflector and to two-dimensionally scan the distance measuring light passing through the optical axis deflector.

Further, the surveying system according to the preferred embodiment further comprises: an attitude detector configured to detect a tilt of the total station relative to a horizontal, wherein the arithmetic control module is configured to correct the distance measurement result and the angle measurement result of the object to be measured, based on a detection result from the attitude detector.

Further, in the surveying system according to the preferred embodiment, the arithmetic control module is configured to detect the object to be measured based on the results of distance measurement and angle measurement while performing the two-dimensional scan, to direct the distance measuring optical axis toward the object to be measured by the optical axis deflector, to perform a distance measurement of the object to be measured and to obtain a three-dimensional coordinate of the object to be measured based on the distance measurement result and the angle measurement result by the projecting direction detecting module.

Further, in the surveying system according to the preferred embodiment, the arithmetic control module is configured to control the optical axis deflector so as to form a two-dimensional scanning pattern, to detect a reflected distance measuring light when the two-dimensional scanning pattern crosses the object to be measured, to obtain a deflection angle of the distance measuring optical axis at the time of detecting the reflected distance measuring light by the projecting direction detecting module, to control the optical axis deflector such that a center of the two-dimensional scanning pattern is directed to the deflection angle, and to track the object to be measured.

Further, in the surveying system according to the preferred embodiment, the object to be measured includes reference reflection part having a reference point, an auxiliary reflection part provided adjacent to the reference reflection part, the two-dimensional scan is a closed loop scanning pattern with a center position that coincides with the distance measuring optical axis, and the arithmetic control module is configured to move the closed loop scanning pattern and to detect the reference reflection part based on a measurement result obtained by the closed loop scanning pattern.

Further, in the surveying system according to the preferred embodiment, the shape of the closed loop scanning pattern can be changed, and a scanning is executed by using a large closed loop scanning pattern in an initial search scan for detecting the object to be measured, and a scanning is executed by using a smaller local scanning pattern in a case of detecting the reference point of the reference reflection part.

Further, in the surveying system according to the preferred embodiment, the arithmetic control module is configured to control the optical axis deflector to execute an initial search scan and a local search scan, wherein the initial search scan is a searching and scanning within a wide range of a maximum deflection angle of the optical axis deflector and the local search scan is a searching and scanning of a narrower range, including the object to be measured, than the initial search scan, wherein the arithmetic control module is configured to control the optical axis deflector to shift to the local search scan when detecting the reflected distance measuring light from the object to be measured by the initial search scan.

Further, in the surveying system according to the preferred embodiment, the total station further comprises: a total station main body, a horizontal rotary unit and a vertical rotary unit, wherein the arithmetic control module is configured to horizontally rotate and vertically rotate the total station main body by the horizontal rotary unit and the vertical rotary unit in such a manner that a center of the scanning pattern directs to a direction in which the reflected distance measuring light is detected.

Further, in the surveying system according to the preferred embodiment, the target instrument includes a pole, a reference reflection part having a greater diameter than the pole is provided at a predetermined position of the pole, and the reference reflection part is wound by a reflection sheet such that an entire circumference of the reference reflection part is covered, an auxiliary reflection part is formed by winding the pole with a reflection sheet such that an entire circumference of the pole is covered.

Further, in the surveying system according to the preferred embodiment, a non-reflection part is formed at a boundary between the reference reflection part and the auxiliary reflection part.

Further, in the surveying system according to the preferred embodiment, the target instrument includes a band-like flat-plate, the reference reflection part is provided at a predetermined position of the flat-plate, the reference reflection part is formed of a circular reflection sheet with a reference point as a center and a non-reflection part formed around the reflection sheet, and an auxiliary reflection part is provided adjacent to the reference reflection part.

Further, in the surveying system according to the preferred embodiment, the target instrument has a reflecting plate having a size in which the local scanning pattern is included, a reflection sheet is provided across an entire surface of the reflecting plate, and at least two or more non-reflective straight lines that intersect at a reference point are furthermore formed on the reflecting plate.

Further, in the surveying system according to the preferred embodiment, the arithmetic control module is configured to detect a tilt angle and a tilt direction of the target instrument based on a measurement result obtained from the auxiliary reflection part in the two-dimensional scan.

Further, in the surveying system according to the preferred embodiment, the two-dimensional scan is a circular scan pattern, and the arithmetic control module is configured to determine a tilt of the target instrument based on an amplitude of a sine curve obtained from a distance measurement result of the circular scan pattern, and to determine a rotation of the target instrument based on a shift in a phase of the sine curve.

According to the present invention, the surveying system comprises: a total station and a target instrument, wherein the target instrument has an object to be measured which is provided with a reflection sheet as a retro-reflector, wherein the total station has a distance measuring light projecting unit for projecting a distance measuring light, a light receiving unit for receiving a reflected distance measuring light and producing a light receiving signal, a distance measuring unit for performing a distance measurement of an object to be measured based on the light receiving signal, an optical axis deflector provided on a distance measuring optical axis and capable of deflecting the distance measuring optical axis two-dimensionally, a projecting direction detecting module for detecting a deflection angle of the distance measuring optical axis and performing an angle measurement, and an arithmetic control module for controlling a deflecting action of the optical axis deflector and a distance measuring action of the distance measuring unit, wherein the arithmetic control module is configured to two-dimensionally scan the object to be measured with the distance measuring light by using the optical axis deflector and to perform a distance measurement and an angle measurement with respect to the object to be measured, and further to detect a tilt and a tilt direction of the target instrument based on two or more results of distance measurement and angle measurement. As a result, a measuring point can be measured directly regardless of the posture of a member supporting the object to be measured.

BRIEF DESCRIPTION OF THE DRAWINGS

FIG. 16A and FIG. 16B are explanatory drawings of a signal acquired at the time of scanning in the target instrument of the fourth embodiment, in which FIG. 16A is a drawing to show a change in a light receiving amount and FIG. 16B is a drawing to show a distance measurement result.

DETAILED DESCRIPTION OF THE PREFERRED EMBODIMENT

A description will be given below on an embodiment of the present invention by referring to the attached drawings.

By referring to FIG. 1, FIG. 2 and FIG. 3, a description will be given on general features of a surveying system according to the embodiments of the present invention.

Figure 1:
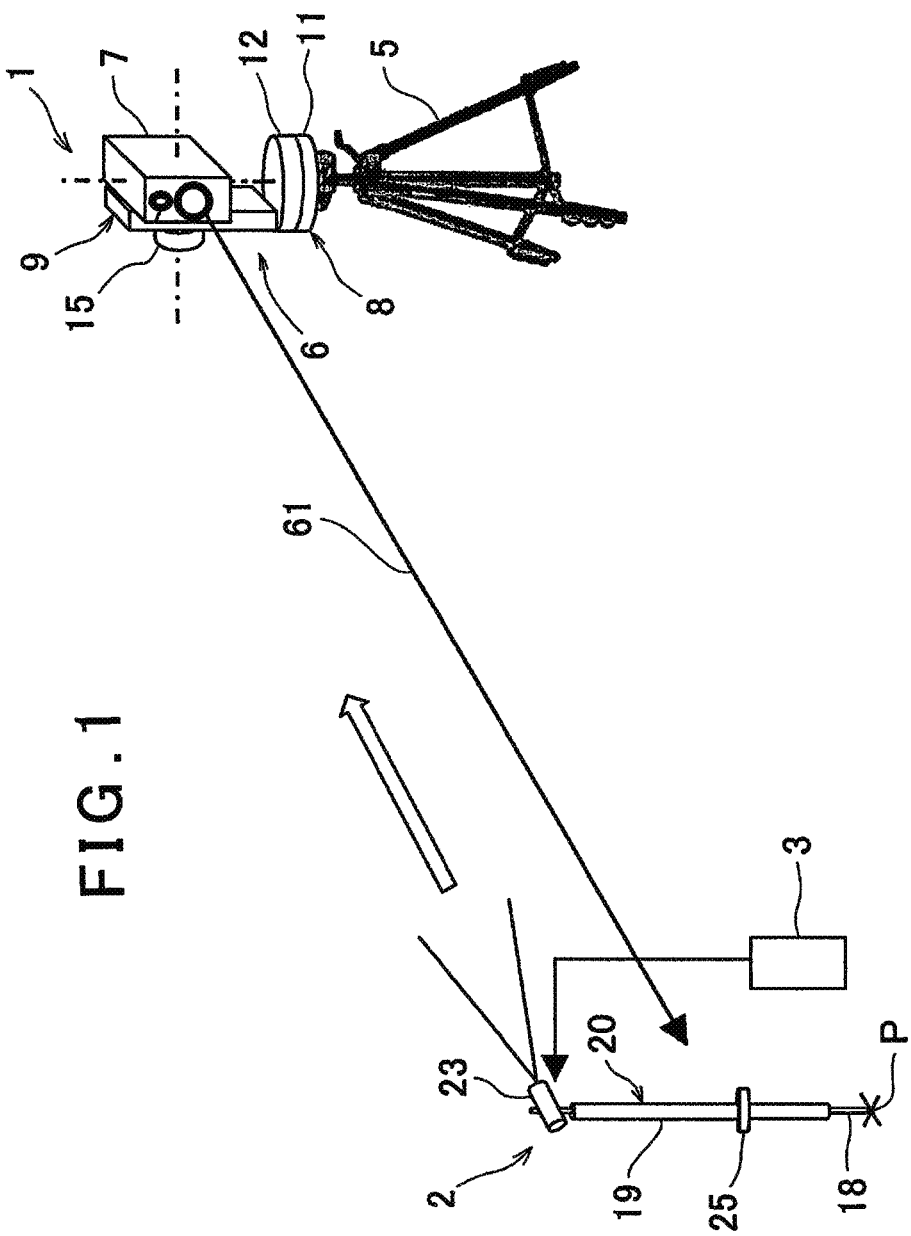
FIG. 1 is a schematical drawing of a surveying system according to an embodiment of the present invention.
Figure 2:
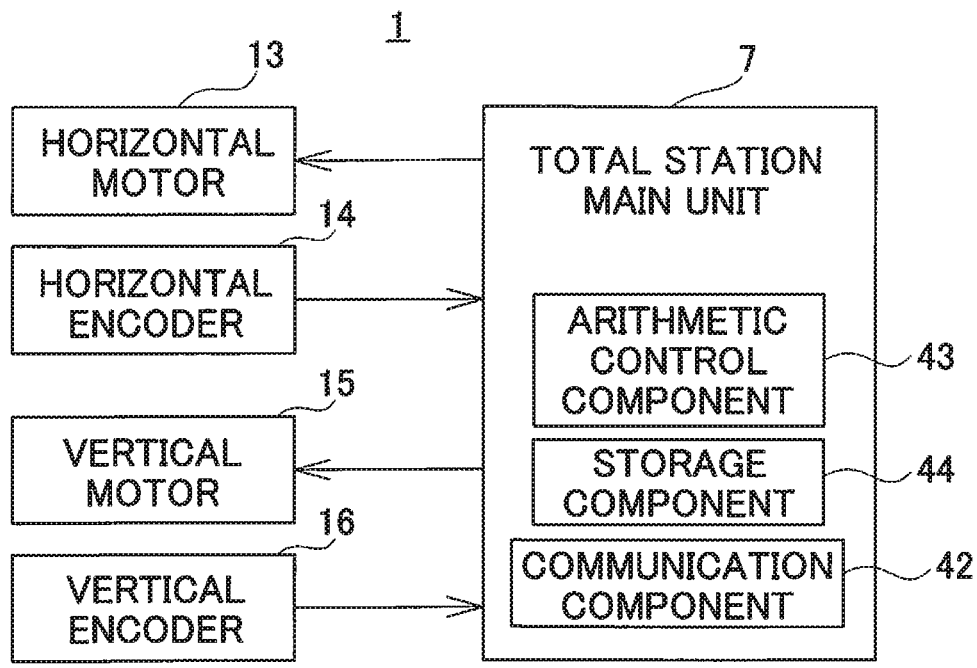
FIG. 2 is a schematical block diagram of a total station in the surveying system.

In FIG. 1, reference numeral 1 denotes a total station in the present embodiment, reference numeral 2 denotes a target instrument and reference numeral 3 denotes a data collector.

The total station 1 is installed at a known point and the target instrument 2 is installed at a measuring point.

The total station 1 primarily includes a tripod 5, an installation base 6 provided on an upper end of the tripod 5, and a total station main body 7 provided on the tripod 5 via the installation base 6.

Further, the installation base 6 has a horizontal rotary unit 8 capable of a horizontal rotation and a vertical rotary unit 9 installed upright on the horizontal rotary unit 8. The horizontal rotary unit 8 includes a fixed base 11 and a horizontal rotating seat 12, the horizontal rotating seat 12 is provided rotatably around a vertical axis as a center with respect to the fixed base 11. The horizontal rotating seat 12 is driven and rotated by a horizontal motor 13, and configured so that a rotation angle of the horizontal rotating seat 12 in the horizontal direction is detected by a horizontal encoder 14 as a rotation angle detector.

On the vertical rotary unit 9, the total station main body 7 is provided rotatably around a horizontal axis as a center. The total station main body 7 is driven and rotated by a vertical motor 15, and configured so that a rotation angle of the total station main body 7 in the vertical direction is detected by a vertical encoder 16 as a rotation angle detector.

The drivings of the horizontal motor 13 and the vertical motor 15 are controlled by an arithmetic control module 43 (a CPU, for instance) of the total station main body 7 and it is so configured that a horizontal angle and a vertical angle detected respectively by the horizontal encoder 14 and the vertical encoder 16 are input into the arithmetic control module 43. Further, the total station main body 7 as described later has a storage module 44 and a communication module 42, and data acquired by the total station main body 7 is configured so as to be stored in the storage module 44 and is transmitted to the data collector 3 via the communication module 42.

As the storage module 44, an HDD, a semiconductor memory and a memory card and the like are used. In the storage module 44, various types of programs are stored. These programs include: a measurement program for executing the distance measurement and the angle measurement, an image processing program, a communication program for performing communication with the data collector 3, a program for controlling a distance measuring operation of a distance measuring unit as described later, a program for controlling an image pickup of an image pickup unit 38 as described later, a program for controlling a deflecting operation of an optical axis deflector 62 as described later, a scanning execution program for scanning a distance measuring light in various patterns, a control program for synchronously controlling a measuring operation, an image pickup operation and an optical axis deflecting operation, a scanning control program for controlling the optical axis deflector 62 and scanning the distance measuring light in a required mode, a display program for displaying a measurement state, a measurement result and an image of an object to be measured on a display unit 47 as described later, and other programs.

The arithmetic control module 43 executes the various programs as described above and controls and executes the distance measurement, the angle measurement, the scanning of the distance measuring light and searching of the object to be measured.

It is to be noted that, in a case where a measurement range by the total station 1 is within a range of a deflection angle by the optical axis deflector 62 (to be described later) or in a case where an initial setting of a direction of a reference optical axis O (to be described later) of the optical axis deflector 62 is carried out manually, the horizontal motor 13 of the horizontal rotary unit 8, the horizontal encoder 14, the vertical motor 15 of the vertical rotary unit 9, the vertical encoder 16 and the like can be omitted.

The target instrument 2 has a pole 18 which is a rod-like supporting member with a circular cross section, and a reference reflection part 25 provided in the middle of the pole 18. A reflection sheet as a retro-reflector is wound around an entire circumference of the reference reflection part 25 and a reflection sheet 19 as a retro-reflector is wound around the pole 18 so as to cover the entire circumference in such a manner that the pole 18 is partially exposed above and below respectively. The part where the reflection sheet 19 is wound around constitutes a linear reflection part 20 having a predetermined length in an up-and-down direction. Each of the reference reflection part 25 and the linear reflection part 20 reflects the distance measuring light respectively, and becomes an object to be measured of the total station 1. The opposite of the reference reflection part 25 showing a reference point (to be described later), the linear reflection part 20 is an auxiliary reflection part which makes the detection of the object to be measured and further, the detection of the reference reflection part 25, easier.

A lower end of the pole 18 is designed as a tip capable of indicating a measuring point P. Further, an illuminating lamp 23 is provided on an upper end of the pole 18 via a universal connecting tool (not shown). A position of the illuminating lamp 23 for instance, a distance between the lower end of the pole 18 and the universal connecting tool is already known. Further, a mechanical relationship between the freely connectable tool and the illuminating lamp 23 is already known.

The universal connecting tool supports the illuminating lamp 23 with respect to the pole 18, capable of tilting in a left-and-right direction, and at least in an up-and-down direction, and further, a friction force acts on a rotating part of the universal connecting tool, and the universal connecting tool is configured so that an attitude of the illuminating lamp 23 with respect to the pole 18 is maintained at an arbitrary position.

A radiation angle of the illumination light of the illuminating lamp 23 is approximately 30°, and further, it is preferable that the illuminating lamp 23 has a zoom function and the radiation angle can be reduced to approximately 10°.

The reference reflection part 25 is provided at a predetermined position from the lower end of the pole 18. A center of the reference reflection part 25 is the reference point and regarding the reference point, a distance from the lower end of the pole 18 is already known. Further, a positional relationship with respect to the illuminating lamp 23 is also already known.

The reference reflection part 25 has a predetermined thickness (a length in an axial direction) larger than a beam diameter of the distance measuring light and is larger with respect to a diameter of the linear reflection part 20.

Here, a diameter difference between the reference reflection part 25 and the linear reflection part 20 is determined in accordance with a measurement accuracy of the total station main body 7, and ½ of this diameter difference, that is, a radius difference only needs to be the measurement accuracy (a measurement error) or more of the total station main body 7. Further, a thickness of the reference reflection part 25 is set larger than the beam diameter of the distance measuring light. Further, it is needless to say that the diameter difference is determined in accordance with the diameter of the linear reflection part 20, a measurement condition, a measurement capability of the total station main body 7 and the like.

In a case of the present embodiment, assuming that a measured distance is 200 m at maximum, the diameter of the linear reflection part 20 is set to 35 mm, the diameter of the reference reflection part 25 is set to 100 mm, and the thickness of the reference reflection part 25 is set to 30 mm.

Figure 3:
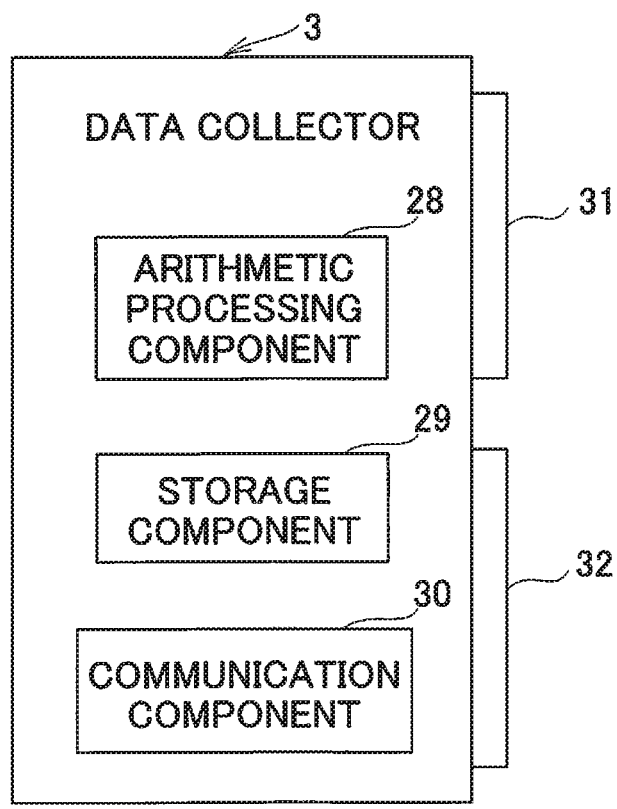
FIG. 3 is a schematical block diagram of a data collector in the surveying system.

As shown in FIG. 3, the data collector 3 includes an arithmetic processing module 28, a storage module 29, a communication module 30, a display unit 31 and an operation unit 32. It is to be noted that the display unit 31 may be a touch panel, the display unit 31 may also serve the function of an operation unit, and the operation unit 32 may be omitted. It is to be noted that a terminal such as a smart phone or the like may be used as the data collector 3.

As the storage module 29, an HDD, a semiconductor memory and a memory card and the like are used. In the storage module 29, various types of programs are stored. These programs include: a communication program for performing communication with the total station main body 7, a program for remotely operating the total station main body 7, a program for displaying a measurement result, an image and the like on the display unit 31, a program for creating a command for remote operation from the data input from the operation unit 32, and other programs.

As the arithmetic processing module 28, a CPU and the like are used. The arithmetic processing module 28 executes the programs as described above and issues a command for remotely operating the total station main body 7 in a required state.

The data collector 3 and the total station main body 7 are capable of communicating via the communication module 30 and the communication module 42, the total station main body 7 can be remotely operated via the data collector 3, or data such as distance measurement results and images and the like acquired by the total station main body 7 is transmitted to the data collector 3 and stored in the storage module 29. It is to be noted that the total station main body 7 may be attachable and detachable with respect to the installation base 6.

Figure 4:
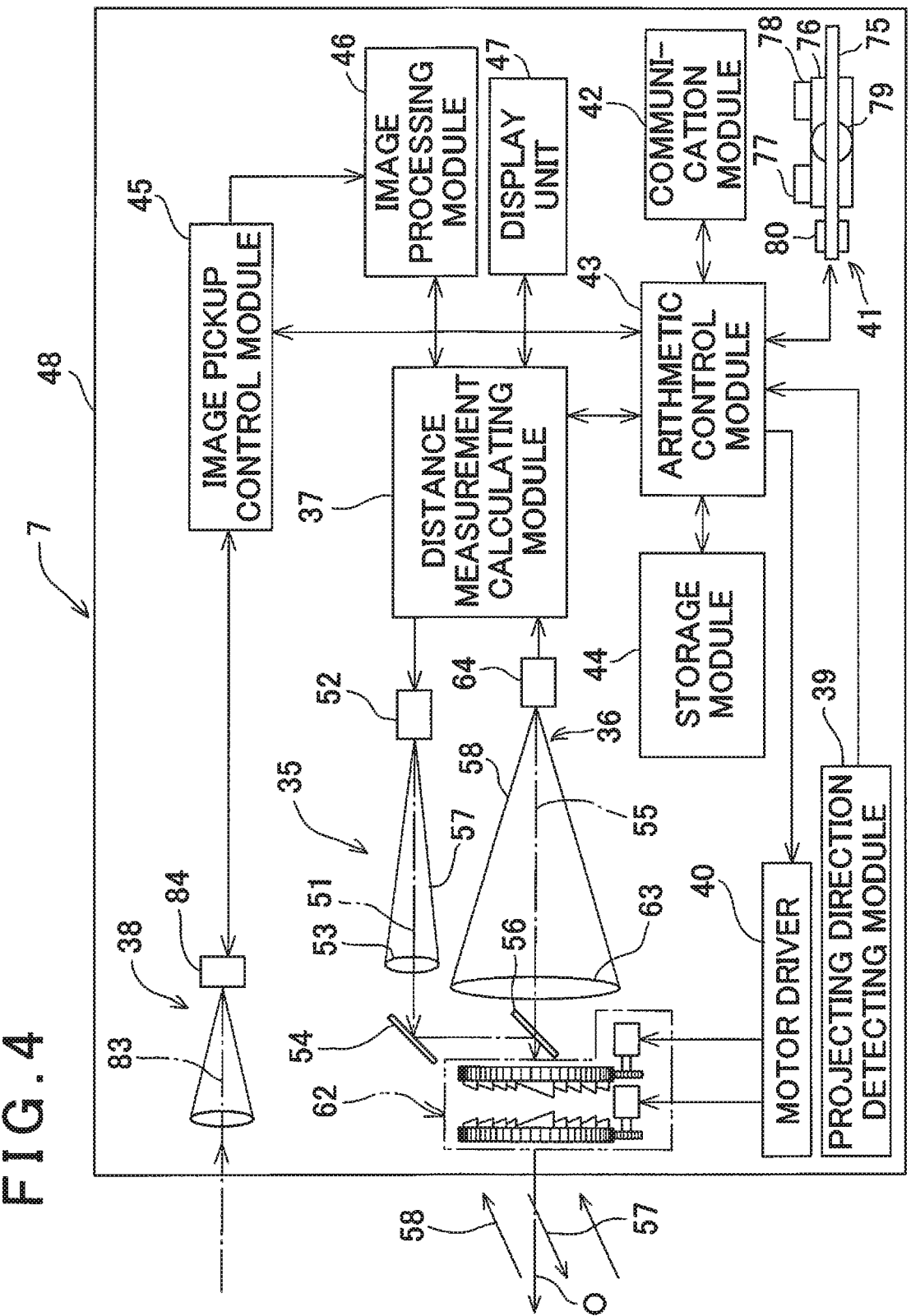
FIG. 4 is a schematical block diagram of a total station main body in the surveying system.

Next, a description of the total station main body 7 will be given concretely by referring to FIG. 4.

The total station main body 7 comprises a distance measuring light projecting unit 35, a light receiving unit 36, a distance measurement calculating unit 37, the image pickup unit 38, a projecting direction detecting module 39, a motor driver 40, an attitude detector 41, the communication module 42, the arithmetic control module 43, the storage module 44, an image pickup control module 45, an image processing module 46 and the display unit 47, and they are accommodated in a housing 48 and integrated. It is to be noted that the distance measuring light projecting unit 35, the light receiving unit 36, the distance measurement calculating unit 37 or the like constitute a distance measuring unit which functions as an electronic distance meter.

The distance measuring light projecting unit 35 has a projection optical axis 51, and a light emitting element 52 such as a laser diode (LD), for instance, is provided on the projection optical axis 51. Further, a projecting lens 53 is provided on the projection optical axis 51. Further, by a first reflection mirror 54 as a deflecting optical component provided on the projection optical axis 51 and by a second reflection mirror 56 as a deflecting optical component provided on a light receiving optical axis 55 (to be described later), the projection optical axis 51 is deflected so as to coincide with the light receiving optical axis 55. The first reflection mirror 54 and the second reflection mirror 56 constitute a projection optical axis deflector.

The light emitting element 52 emits a pulsed laser beam, and the distance measuring light projecting unit 35 projects the pulsed laser beam emitted from the light emitting element 52 as a distance measuring light 57.

A description will be given on the light receiving unit 36. As the light receiving unit 36, a photodiode (PD) or an avalanche photodiode (APD) is used. A reflected distance measuring light 58 from an object to be measured enters the light receiving unit 36. The light receiving unit 36 has the light receiving optical axis 55, and the light receiving optical axis 55 coincides with the projection optical axis 51 deflected by the first reflection mirror 54 and the second reflection mirror 56, as described above. It is to be noted that a condition where the projection optical axis 51 is coincided with the light receiving optical axis 55 is determined as a distance measuring optical axis 61 (see FIG. 1).

The optical axis deflector 62 (to be described later) is disposed on the deflected projection optical axis 51, that is, on the light receiving optical axis 55. A straight optical axis passing through a center of the optical axis deflector 62 is a reference optical axis O. The reference optical axis O coincides with the projection optical axis 51 or the light receiving optical axis 55 or the distance measuring optical axis 61 when the optical axes 51, 55 or 61 is not deflected by the optical axis deflector 62.

The reflected distance measuring light 58 passes through the optical axis deflector 62, an image forming lens 63 is disposed on the light receiving optical axis 55 as entered, and a light receiving element 64 such as a photodiode (PD), for instance, is provided on the light receiving optical axis 55. The image forming lens 63 forms an image of the reflected distance measuring light 58 on the light receiving element 64. The light receiving element 64 receives the reflected distance measuring light 58 and produces a light receiving signal. The light receiving signal is input into the distance measurement calculating unit 37. The distance measurement calculating unit 37 performs the distance measurement to the measuring point based on the light receiving signal.

Figure 5:
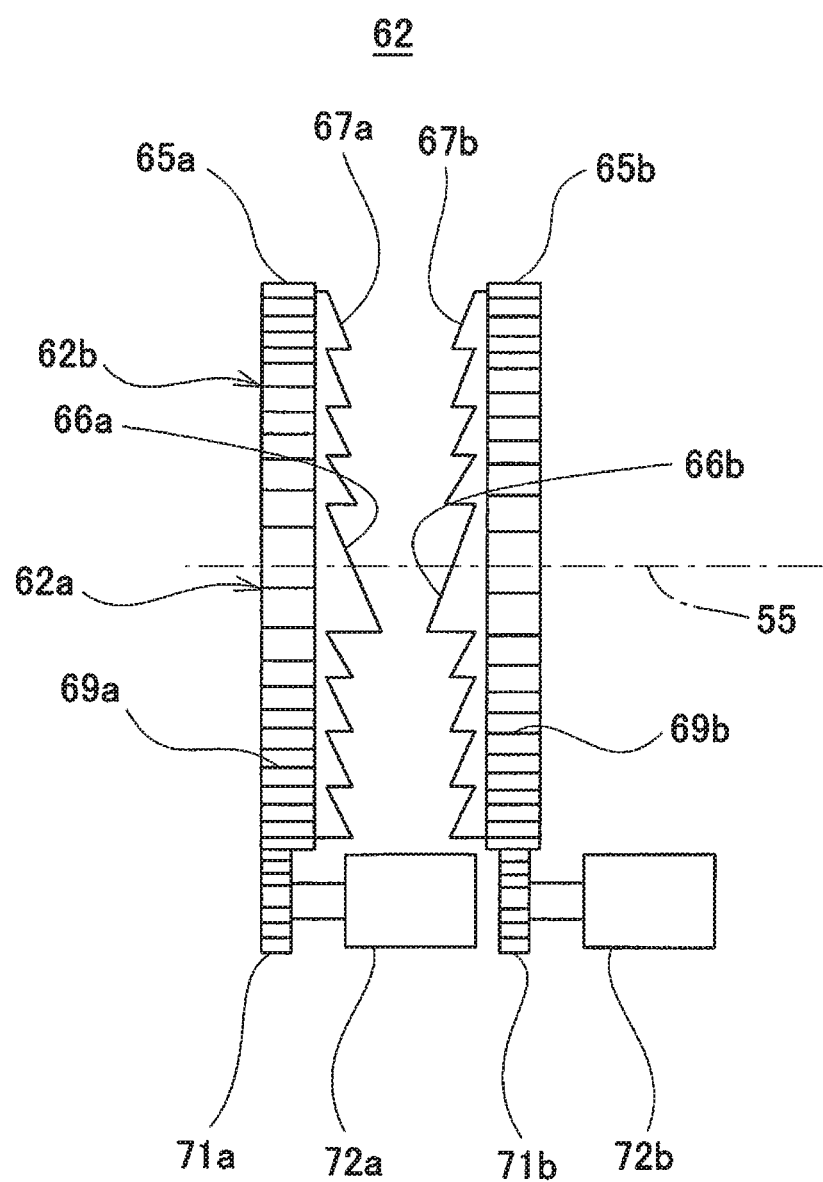
FIG. 5 is a schematical drawing of an optical axis deflector in the total station main body.

A description will be given on the optical axis deflector 62 by referring to FIG. 5.

The optical axis deflector 62 is constituted of a pair of optical prisms 65a and 65b. The optical prisms 65a and 65b are designed in a disk-like shape respectively and disposed perpendicularly crossing the light receiving optical axis 55 on the light receiving optical axis 55. Further, the optical prisms 65a and 65b overlap one another and are arranged in parallel to each other. The optical prisms 65a and 65b may be constituted by a required number of rod-like glass triangular prisms arranged in parallel. For instance, the optical prisms 65a and 65b may be constituted by three glass triangular prisms. Alternatively, Fresnel prisms can be used as the optical prisms 65a and 65b respectively. By using the Fresnel prisms, a thickness of the prism can be made thinner, and the size of the instrument can be reduced.

A central part of the optical axis deflector 62 is designed as a distance measuring light deflecting unit 62a which is a first optical axis deflector which the distance measuring light 57 passes through and is projected from. A part other than the central part of the optical axis deflector 62 is designed as a reflected distance measuring light deflecting unit 62b which is a second optical axis deflector which the reflected distance measuring light 58 passes and enters.

The Fresnel prisms used as the optical prisms 65a and 65b are constituted of prism elements 66a and 66b made of single prisms respectively, and a large number of prism elements 67a and 67b which are formed in parallel to each other respectively, and have a disk-like shape. The optical prisms 65a and 65b, each of the prism elements 66a and 66b and the prism elements 67a and 67b have the same optical characteristics, respectively.

The prism elements 66a and 66b have a size enough to pass through the distance measuring light 57. Since the prism elements 66a and 66b consist of single prisms, highly accurate optical characteristics can be acquired. The prism elements 66a and 66b constitute the distance measuring light deflecting unit 62a.

The Fresnel prisms are constituted by a large number of the prism elements 67a and 67b respectively, and the prism elements 67a and 67b act as the reflected distance measuring light deflecting unit 62b. Further, since a distance from the optical axis deflector 62 to the light receiving element 64 is short, highly accurate optical characteristics are not required for each of the prism elements 67a and 67b.

The Fresnel prism may be manufactured from the optical glass but may be molded from an optical plastic material. By molding the Fresnel prism from the optical plastic material, a more inexpensive Fresnel prism can be manufactured. It is to be noted that only the prism elements 66a and 66b requiring high accuracy may be manufactured from the optical glass.

The optical prisms 65a and 65b are disposed independently and individually rotatable round the light receiving optical axis 55 as a center, respectively. The optical prisms 65a and 65b, when their rotating directions, rotation amounts and rotating speeds are individually controlled, deflect the projection optical axis 51 of the projected distance measuring light 57 in a two-dimensional arbitrary direction, and deflect the light receiving optical axis 55 of the received reflected distance measuring light 58 in parallel to the projection optical axis 51.

An outer shape of each of the optical prisms 65a and 65b is designed as a circle shape around the light receiving optical axis 55 as the center, respectively. Further, by taking an expansion of the reflected distance measuring light 58 into consideration, diameters of the optical prisms 65a and 65b are set so that a sufficient light amount can be obtained.

A ring gear 69a is fitted with an outer periphery of the optical prism 65a, and a ring gear 69b is fitted with an outer periphery of the optical prism 65b.

A driving gear 71a meshes with the ring gear 69a, and the driving gear 71a is fixed to an output shaft of a motor 72a. Similarly, a driving gear 71b meshes with the ring gear 69b, and the driving gear 71b is fixed to an output shaft of motor 72b. The motors 72a and 72b are electrically connected to the motor driver 40.

As the motors 72a and 72b, a motor capable of detecting a rotation angle or a motor which rotates corresponding to a driving input value such as a pulse motor, for instance, is used. Alternatively, a rotation angle detector which detects a rotation amount (rotation angle) of a motor such as an encoder or the like, for instance, may be used to detect the rotation amount of the motor. The rotation amounts of the motors 72a and 72b are detected respectively, and the motors 72a and 72b are individually controlled by the motor driver 40. It is to be noted that an encoder may be mounted directly on the ring gears 69a and 69b respectively, and configured so that the rotation angles of the ring gears 69a and 69b are directly detected by the encoders.

The driving gears 71a and 71b and the motors 72a and 72b are provided at positions not interfering with the distance measuring light projecting unit 35, for instance, on lower sides of the ring gears 69a and 69b.

The projecting lens 53, the first reflection mirror 54, the second reflection mirror 56, the distance measuring light deflecting unit 62a or the like make up a light projecting optical system, and the reflected distance measuring light deflecting unit 62b, the image forming lens 63 or the like make up a light receiving optical system.

The distance measurement calculating unit 37 controls the light emitting element 52, and makes the light emitting element 52 to emit a pulsed laser beam as the distance measuring light 57. The projection optical axis 51 is deflected by the prism elements 66a and 66b (the distance measuring light deflecting unit 62a) so that the distance measuring light 57 is directed toward a measuring point. The distance measurement is performed under a condition where the distance measuring optical axis 61 sights the object to be measured (the reference reflection part 25).

The reflected distance measuring light 58 as reflected from the reference reflection part 25 enters through the prism elements 67a and 67b (the reflected distance measuring light deflecting unit 62b) and the image forming lens 63, and is received by the light receiving element 64. The light receiving element 64 sends a light receiving signal to the distance measurement calculating unit 37, the distance measurement calculating unit 37 performs a distance measurement of a measuring point (a point irradiated by the distance measuring light) every each pulsed light based on a light receiving signal from the light receiving element 64, and the distance measurement data is stored in the storage module 44.

The projecting direction detecting module 39 detects rotation angles of the motors 72a and 72b by counting driving pulses input to the motors 72a and 72b. Alternatively, based on a signal from an encoder, the projecting direction detecting module 39 detects the rotation angles of the motors 72a and 72b. Further, the projecting direction detecting module 39 calculates rotational positions of the optical prisms 65a and 65b based on the rotation angles of the motors 72a and 72b. Further, the projecting direction detecting module 39 calculates a deflection angle and a projecting direction (a deflecting direction) with respect to the reference optical axis O of the distance measuring light every pulsed light based on refractive indexes and the rotational positions of the optical prisms 65a and 65b, and a calculation result (angle measurement result) is input to the arithmetic control module 43 in association with the distance measurement result.

The arithmetic control module 43 controls a deflecting action by the optical axis deflector 62 by controlling rotating directions and rotating speeds of the motors 72a and 72b and a rotation ratio between the motors 72a and 72b. Further, the arithmetic control module 43 calculates a horizontal angle and a vertical angle of the measuring point with respect to the distance measuring optical axis 61 from a deflection angle and a projecting direction of the distance measuring light 57 and associates the horizontal angle and the vertical angle regarding the measuring point with the distance measurement data, and hence, three-dimensional data of the object to be measured can be acquired.

Further, if the rotations of the motors 72a and 72b are controlled and the distance measuring light 57 is continuously deflected while the distance measuring light 57 is projected, and the distance measurement can be made while scanning the distance measuring light 57, and the three-dimensional data along a scan locus can be acquired.

Further, the scanning can be performed in an arbitrary pattern within a range of a maximum deflection angle of the optical axis deflector 62 as described later.

A description will be given on the attitude detector 41. It is to be noted that, as the attitude detector 41, an attitude detector disclosed in Japanese Unexamined Patent Application Publication No. 2016-151423 can be used.

A brief description will be given on the attitude detector 41.

The attitude detector 41 has a frame 75. The frame 75 is fixed to the housing 48 or fixed to a structural member and is integrated with the total station main body 7.

A sensor block 76 is mounted on the frame 75 via a gimbal. The sensor block 76 is capable of rotating freely by 360° in two directions around two perpendicular axes as a center, respectively.

A first tilt sensor 77 and a second tilt sensor 78 are mounted on the sensor block 76.

The first tilt sensor 77 is for detecting the horizontality with high accuracy, for instance, a tilt detector which allows a detection light to enter a horizontal liquid surface and detects the horizontality according to a change in a reflection angle of a reflection light or a bubble tube which detects a tilt based on a positional change of a sealed air bubble. Further, the second tilt sensor 78 is for detecting a change in a tilt with high responsiveness, for instance, an acceleration sensor.

A relative rotation angle of the sensor block 76 with respect to the frame 75 regarding the two axes is detected by encoders 79 and 80.

Further, motors (not shown) which rotate the sensor block 76 and maintains its horizontality are provided with respect to the two axes, respectively, and the motors are controlled by the arithmetic control module 43 so that the sensor block 76 is maintained horizontally based on detection results from the first tilt sensor 77 and the second tilt sensor 78.

In a case where the sensor block 76 is tilted (in a case where the total station main body 7 is tilted), the relative rotation angle of the frame 75 with respect to the sensor block 76 (horizontal) is detected by the encoders 79 and 80, and the tilt angle and the tilt direction of the total station main body 7 are detected based on the detection results of the encoders 79 and 80.

Since the sensor block 76 is freely rotatable by 360° with respect to the two axes, regardless of whatever attitude the attitude detector 41 takes (even when the attitude detector 41 is turned upside down, for instance), the attitude detection can be performed in all directions.

In an attitude detection, in a case where a high responsiveness is required, an attitude detection and an attitude control are performed based on the detection result of the second tilt sensor 78. However, a detection accuracy of the second tilt sensor 78 is generally poorer in comparison with the first tilt sensor 77.

The attitude detector 41 includes the first tilt sensor 77 with high accuracy and the second tilt sensor 78 with high responsiveness. As a result, it is possible to perform an attitude control based on the detection result of the second tilt sensor 78 and to detect an attitude detection with high accuracy by the first tilt sensor 77.

The detection result of the second tilt sensor 78 can be calibrated by the detection result of the first tilt sensor 77. That is, in case a deviation occurs between the values of the encoders 79 and 80 when the first tilt sensor 77 detects the horizontality, that is, in a case where the deviation occurs between an actual tilt angle and a tilt angle detected by the second tilt sensor 78, it is possible to calibrate the tilt angle of the second tilt sensor 78 based on the deviation.

Therefore, if the relationship, between the detected tilt angle of the second tilt sensor 78 and the horizontal detection by the first tilt sensor 77 and a tilt angle determined, based on the detection results of the encoders 79 and 80 is acquired in advance, it is possible to perform a calibration of the tilt angle detected by the second tilt sensor 78, and based on this calibration, an accuracy can be improved in the attitude detection with high responsiveness by using the second tilt sensor 78.

The arithmetic control module 43 controls the motor based on a signal from the second tilt sensor 78 when a fluctuation in a tilt is large and when a change in the tilt is rapid. Further, the arithmetic control module 43 controls the motor based on a signal from the first tilt sensor 77 when the fluctuation in the tilt is small and when the change in the tilt is slow, that is, in a condition where the first tilt sensor 77 is capable of following up.

It is to be noted that the storage module 44 stores comparison data showing a comparison result of a detection result of the first tilt sensor 77 and a detection result of the second tilt sensor 78. Based on the signal from the second tilt sensor 78, the detection result by the second tilt sensor 78 is calibrated. By this calibration, it is possible to improve the detection result provided by the second tilt sensor 78 to the detection accuracy of the first tilt sensor 77. Thus, in the attitude detection performed by the attitude detector 41, a high responsiveness can be realized while maintaining a high accuracy.

The image pickup unit 38 is a camera having an image pickup optical axis 83 in parallel with the reference optical axis O of the total station main body 7 and having a field angle approximately equal to a maximum deflection angle (e.g. ±20°) by the optical prisms 65a and 65b or having a field angle larger than the maximum deflection angle such as 50° to 60°, for instance, and the image pickup unit 38 acquires image data including the scanning range of the total station main body 7. The relationship between the image pickup optical axis 83, the projection optical axis 51 and the reference optical axis O is already known, the image pickup optical axis 83, the projection optical axis 51 and the reference optical axis O are in parallel, and further, distances between each of the optical axes are known values. Further, the image pickup unit 38 is capable of acquiring moving images or continuous images.

The image pickup control module 45 controls the image pickup of the image pickup unit 38. When the image pickup unit 38 picks up the moving images or the continuous images, the image pickup control module 45 synchronizes a timing of acquiring frame images constituting the moving images or the continuous images with the timing of scanning (the timing of measuring distance per a laser beam) by the total station main body 7. The arithmetic control module 43 also executes an association between the images and the measurement data.

An image pickup element 84 of the image pickup unit 38 is a CCD or a CMOS sensor which is an aggregate of pixels, and is configured such that a position of each pixel can be specified on an image element. For instance, each pixel has a pixel coordinate in a coordinate system having the image pickup optical axis 83 as an origin, and the position on the image element is specified by the pixel coordinate. Further, a signal from each pixel includes information of the pixel coordinate and the light receiving signal.

Further, the image pickup optical axis 83 of the image pickup unit 38 is in parallel with the reference optical axis O, and further, since the image pickup optical axis 83 and the reference optical axis O is in a known relationship, when specifying a position on the image pickup element 84, the deflection angle with respect to the reference optical axis O of the specified position can be detected.

The image processing module 46 performs image processing such as an edge extraction processing, an extraction of feature points, an image tracking processing, an image matching and the like to the image data acquired by the image pickup unit 38, and detects a position of an illumination light of a target.

The display unit 47 displays an image acquired by the image pickup unit 38 and displays a measuring state, the measurement data and the like. It is to be noted that the display unit 47 is made a touch panel and also functions as an operation unit. Further, in a case where a remote operation is to be performed by the data collector 3, the display unit 47 may be omitted.

A description of a deflecting action and a scan action of the optical axis deflector 62 will be given by referring to FIG. 6A, FIG. 6B and FIG. 6C.

Figure 6A:
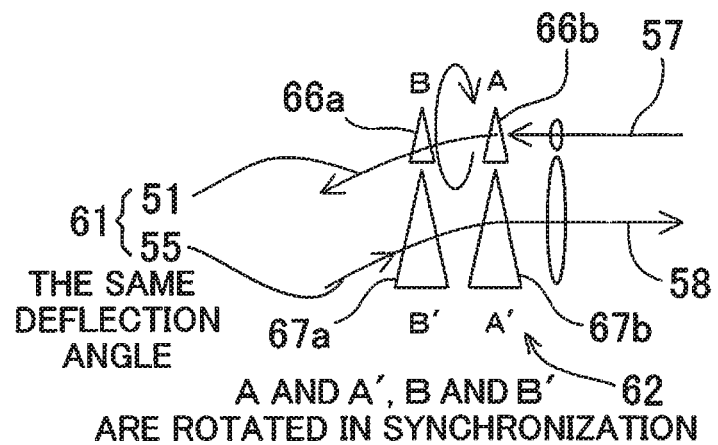
FIG. 6A, FIG. 6B and FIG. 6C are drawings to explain an operation of the optical axis deflector.

It is to be noted that, in order to simplify an explanation, in FIG. 6A, the optical prisms 65a and 65b are shown by separating the prism elements 66a and 66b and the prism elements 67a and 67b. Further, FIG. 6A shows a condition where the prism elements 66a and 66b and the prism elements 67a and 67b are positioned in the same direction, and the maximum deflection angle (e.g. ±20°) is obtained in this condition. Further, the minimum deflection angle is a position where either one of the optical prisms 65a and 65b is rotated by 180°, mutual optical actions of the optical prisms 65a and 65b are offset, and the deflection angle becomes 0°. Therefore, the optical axis (the distance measuring optical axis 61) of the pulsed laser beam, as projected and received through the optical prisms 65a and 65b, coincides with the reference optical axis O.

The distance measuring light 57 is emitted from the light emitting element 52, and the distance measuring light 57 is turned to a parallel luminous flux by the projecting lens 53 and is projected toward the reference reflection part 25 through the distance measuring light deflecting unit 62a (the prism elements 66a and 66b). Here, by passing through the distance measuring light deflecting unit 62a, the distance measuring light 57 is deflected by the prism elements 66a and 66b in a required direction and is projected (FIG. 6A).

The reflected distance measuring light 58 reflected by the reference reflection part 25 is entered through the reflected distance measuring light deflecting unit 62b and is focused on the light receiving element 64 by the image forming lens 63.

When the reflected distance measuring light 58 passes through the reflected distance measuring light deflecting unit 62b, an optical axis of the reflected distance measuring light 58 is deflected by the prism elements 67a and 67b so as to coincide with the light receiving optical axis 55 (FIG. 6A).

By combining a rotation position of the optical prism 65a with the optical prism 65b, a deflecting direction and a deflection angle of the distance measuring light to be projected can be arbitrarily changed.

Further, if the optical prism 65a and the optical prism 65b are integrally rotated by the motors 72a and 72b in a condition where the positional relationship between the optical prism 65a and the optical prism 65b is fixed (that is, in a condition where the deflection angle obtained by the optical prism 65a and the optical prism 65b is fixed), a locus drawn by the distance measuring light passing through the distance measuring light deflecting unit 62a becomes a circle around the reference optical axis O (see FIG. 4) as a center.

Therefore, when the optical axis deflector 62 is rotated while emitting a laser beam from the light emitting element 52, the distance measuring light 57 can be scanned by the circular locus. It is to be noted that it is needless to say that the reflected distance measuring light deflecting unit 62b rotates integrally with the distance measuring light deflecting unit 62a.

Figure 6B:
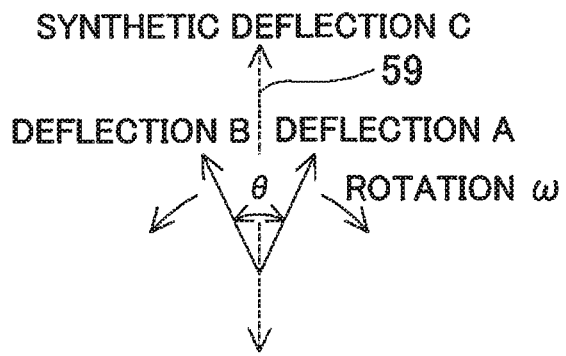

Next, FIG. 6B shows a case where the optical prism 65a and the optical prism 65b are relatively rotated. Assuming that a deflecting direction of the optical axis deflected by the optical prism 65a is a deflection "A" and a deflecting direction of the optical axis deflected by the optical prism 65b is a deflection "B", the deflection of the optical axes by the optical prisms 65a and 65b becomes a synthetic deflection "C" as an angle difference e between the optical prisms 65a and 65b.

Therefore, in a case where the optical prism 65a and the optical prism 65b are synchronized in opposite directions and reciprocally rotated at an equal speed, the distance measuring light 57 passing through the optical prisms 65a and 65b is linearly scanned. Therefore, by reciprocally rotating the optical prism 65a and the optical prism 65b in the opposite directions at the equal speed, as shown in FIG. 6B, the distance measuring light 57 can be made to reciprocally scan in a direction of the synthetic deflection C with a linear locus 59.

Figure 6C:
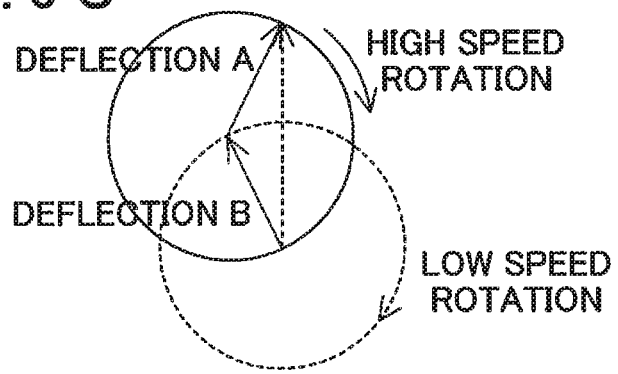

Further, as shown in FIG. 6C, when the optical prism 65b is rotated at a rotating speed lower than a rotating speed of the optical prism 65a, since the distance measuring light 57 is rotated while the angle difference 6 gradually increases, the scan locus of the distance measuring light 57 becomes a spiral form.

Further, by individually controlling the rotating directions and the rotating speeds of the optical prism 65a and the optical prism 65b, the scan locus of the distance measuring light 57 is performed in a radial direction (in the direction of a radius) with the reference optical axis O as the center, or is performed in the horizontal direction or in the vertical direction, or the like, and thereby, various scanning patterns can be obtained.

Furthermore, by synthesizing the horizontal scan and the vertical scan, a two-dimensional scan is made possible. Further, a two-dimensional closed loop scanning pattern with a center can be realized, and in this case, the center of the scanning pattern is coincided with the measuring point. Further, the center of the scanning pattern is coincident with the distance measuring optical axis 61.

Figure 7:
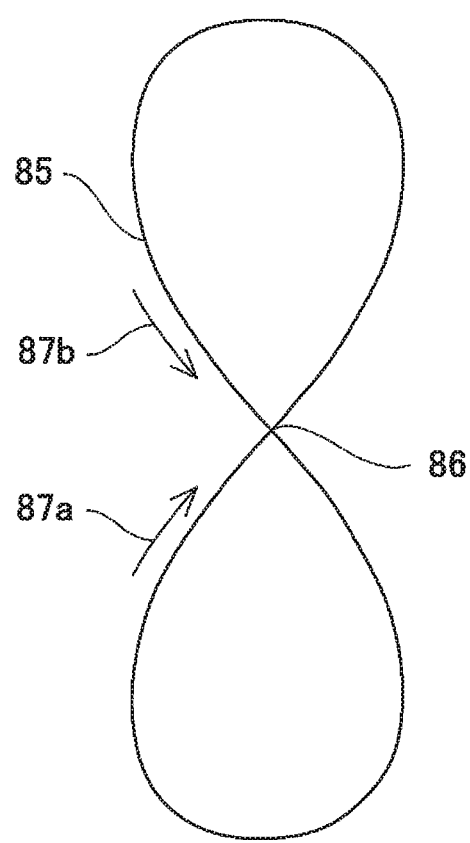
FIG. 7 is a drawing to show one example of a scanning pattern acquired by the optical axis deflector.
Figure 8:
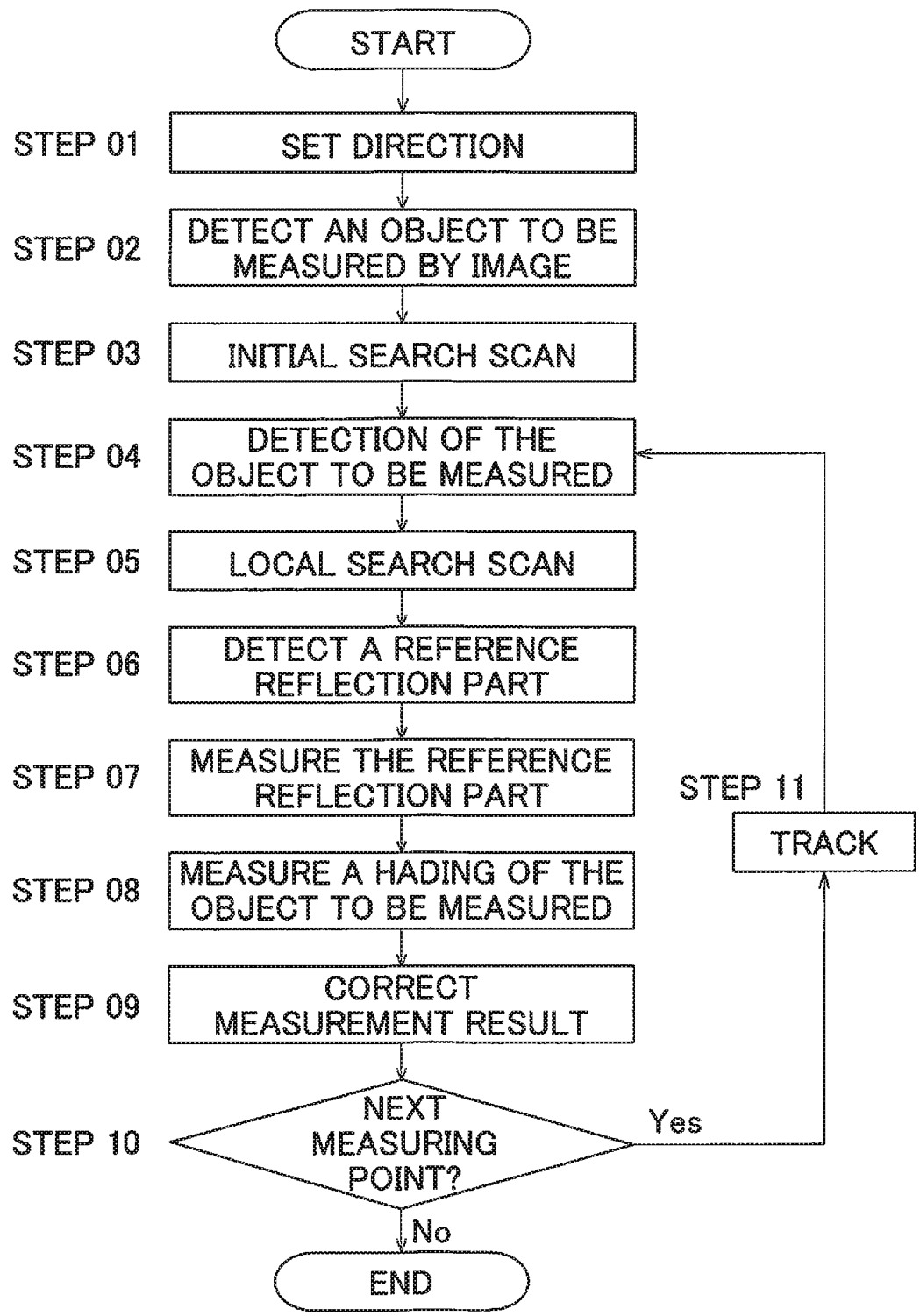
FIG. 8 is a flowchart to show an operation of the present embodiment.

FIG. 7 shows one example of a scanning pattern 85 which is a two-dimensional closed loop scanning pattern in a case where the object to be measured (the linear reflection part 20 and/or the reference reflection part 25 of the target instrument 2) is searched.

By the combination of the rotating directions, the rotating speeds and the rotation ratio of the optical prism 65a and the optical prism 65b, the scanning pattern 85 in which an outward scan 87a and an inward scan 87b cross each other at a center (intersection 86) of the scanning pattern can be formed. For instance, by setting the rotation ratio between the optical prism 65a and the optical prism 65b to 1:2, the scanning can be performed in a shape of a numeral 8.

By referring to FIG. 8, FIG. 9, FIG. 10, FIG. 11A and FIG. 11B, a description will be given on actions of the present embodiment.

A measuring work in the present embodiment is executed by a single operator.

The total station 1 is installed at the known point. Since the attitude (the tilt, the tilt direction) of the total station 1 in the installed state is detected by the attitude detector 41, a leveling work of the total station 1 can be omitted. The direction of the total station 1 is directed approximately toward the direction of the measuring point.

After the installation of the total station 1, the target instrument 2 is moved to the measuring point, and a lower end of the pole 18 is installed at a measuring point P.

The illuminating lamp 23 is directed toward the direction of the total station 1, and the illuminating lamp 23 is turned on. Since a radiation angle of the illumination light of the illuminating lamp 23 is as wide as approximately 30°, the total station 1 can be captured by the illumination light by roughly matching the direction of the illuminating lamp 23 to the total station 1 (Step 01).

A command to start a measurement is transmitted from the data collector 3 to the total station 1.

The total station 1 acquires an image of the illuminating lamp 23 by the image pickup unit 38 in accordance with the command to start the measurement. As described above, since the field angle of the image pickup unit 38 is as wide, as 50° to 60°, only by directing the total station 1 to the approximate direction of the measuring point, the illumination light of the illuminating lamp 23, that is, the illuminating lamp 23 can be reliably captured.

The arithmetic control module 43 calculates a position of the illuminating lamp 23 (a center of the illumination light) from the image, and further, calculates the direction (the horizontal angle and the vertical angle) of the reference reflecting part 25 from the known positional relationship between the illuminating lamp 23 and the reference reflecting part 25.

Based on this calculation result, the arithmetic control module 43 controls the horizontal rotary unit 8 and the vertical rotary unit 9 and directs the distance measuring optical axis 61 of the total station 1 toward the reference reflection part 25. In a condition where the distance measuring optical axis 61 is directed toward the reference reflection part 25, the reference reflection part 25 exists approximately at the center of the image picked up by the image pickup unit 38 (Step 02).

The distance measuring light 57 is projected from the distance measuring light projecting unit 35, and the arithmetic control module 43 controls the rotation of the optical prisms 65a and 65b, and based on the acquired direction (the horizontal angle and the vertical angle) of the reference reflection part 25, a two-dimensional searching and scanning is performed near the reference reflection part 25.

In the two-dimensional searching and scanning, an initial search scan with a wide search range and a local search scan limited to a narrow range including the object to be measured are executed. First, the initial search scan for detecting the target instrument 2 is started. After the target instrument 2 is detected, the local search scan is executed. Here, since the searching operation is only to rotate the optical prisms 65a and 65b with small masses, the operation can be performed at an extremely high speed (Step 03 to Step 05).

In a description as given below, the two-dimensional scanning pattern 85 in the shape of the numeral 8 is adopted as the search scanning pattern.

Figure 9:
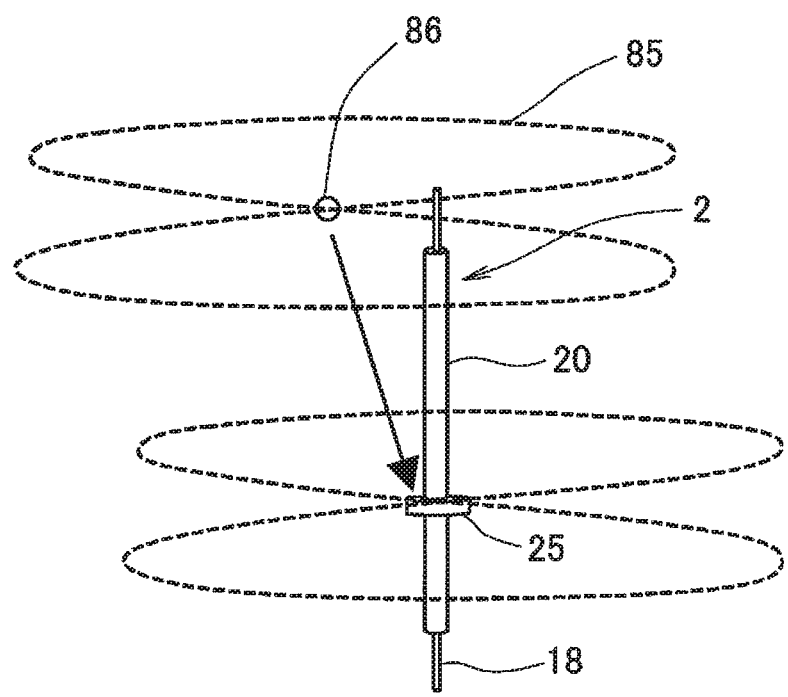
FIG. 9 is an explanatory drawing to show a relationship between the scanning pattern and an object to be measured.

A shape of the scanning pattern 85 in the initial search scan at the start of the search has a flat shape of numeral 8 in the horizontal direction, as shown in FIG. 9.

Since the linear reflection part 20 is elongated in the vertical direction, by flattening the scanning pattern 85, a high-speed search in a wide range becomes possible. It is to be noted that it is preferable to have a flat shape in the initial search scan, regardless of the shape of the scanning pattern.

Since the distance measurement and the angle measurement are also executed together with the execution of the scanning pattern 85, the position of the linear reflection part 20 in the horizontal direction can be measured immediately based on the reflected distance measuring light 58 from the linear reflection part 20.

Therefore, a condition, where a path of the scanning pattern 85 in the initial search scan and the linear reflection part 20 cross each other, is obtained by the execution of the scanning pattern 85, and the position in the horizontal direction is detected (Step 03).

The arithmetic control module 43 controls the optical axis deflector 62 based on the measurement result, and then, moves the intersection 86 along the linear reflection part 20 until the reference reflection part 25 is detected by the scanning pattern 85 (in FIG. 9, the intersection 86 is moved downward) (Step 04).

Figure 10:
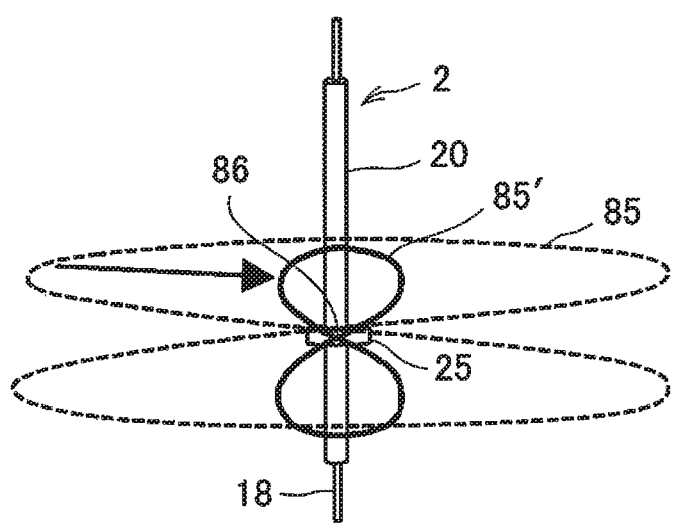
FIG. 10 is an explanatory drawing to show a relationship between the scanning pattern, a local scanning pattern and the object to be measured.

When the reference reflection part 25 is detected by the scanning pattern 85, the arithmetic control module 43 changes the scanning pattern 85 to a two-dimensional local scanning pattern 85' suitable for detection of a center position of the reference reflection part 25 (see FIG. 10). The local scanning pattern 85' has a narrow search range and has a vertically elongated shape. Here, since the reference reflection part 25 is protruded than the linear reflection part 20, the detection of the reference reflection part 25 can be confirmed by a change in the distance measurement result. It is to be noted that it is preferable to have a vertically elongated shape in the initial search scan, regardless of the shape of the scanning pattern.

Figure 11A:
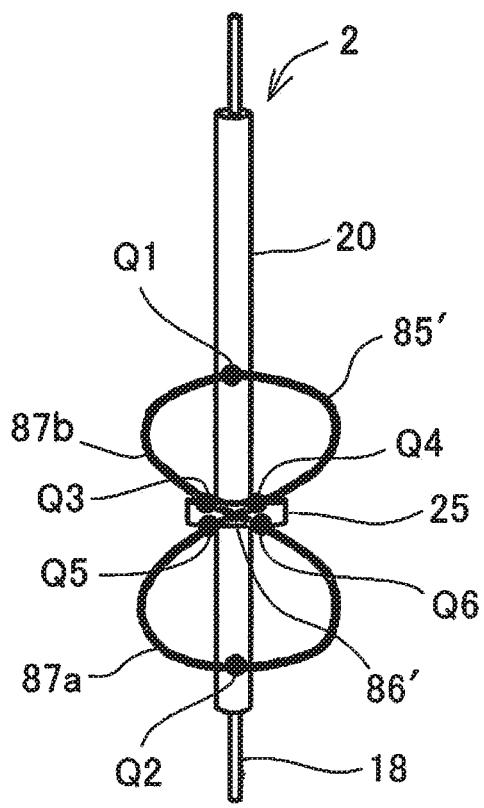
FIG. 11A is an explanatory drawing to show a detection of a reference reflection part by the local scanning pattern and a detection of a tilt of a target instrument.
Figure 11B:
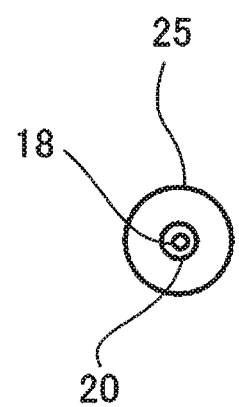
FIG. 11B is a top view of the target instrument.

FIG. 11A and FIG. 11B shows a condition where the local search scan is being executed by the local scanning pattern 85' (Step 05).

When an intersection 86' of the local scanning pattern 85' comes near the center of the reference reflection part 25, the outward scan 87a and the inward scan 87b of the local scanning pattern 85' passes an edge of the reference reflection part 25. A position of the intersection 86' with respect to the reference reflection part 25 can be measured based on the measurement results of measuring points Q3, Q4, Q5 and Q6 of this edge, and the intersection 86' can be coincided with the center of the reference reflection part 25 (Step 06).

When the intersection 86' is coincident with the center of the reference reflection part 25, the distance measuring optical axis 61 is sighted to the center of the reference reflection part 25, and the measurement of the reference reflection part 25 is executed (Step 07).

Further, by the execution of the local scanning pattern 85', the positions (the three-dimensional coordinates) of the upper and lower measuring points Q1 and Q2 of the linear reflection part 20 are measured. By the three-dimensional coordinates of the measuring points Q1 and Q2, a hading (an inclining) of the target instrument 2 can be measured in the front/rear and in the left/right direction and the measurement result of the reference reflection part 25 can be corrected based on the three-dimensional coordinates of the measuring points Q1 and Q2 (Step 08 and Step 09).

Further, the hading of the target instrument 2 obtained here is an inclining with respect to the distance measuring optical axis 61, and the distance measuring optical axis 61 itself is not necessarily horizontal. The tilt angle and the tilt direction of the distance measuring optical axis 61 with respect to the reference optical axis O can be measured by the projecting direction detecting module 39, and further, the tilt angle and the tilt direction of the reference optical axis O with respect to the horizontal can be measured by the attitude detector 41.

Therefore, the tilt angle and the tilt direction of the target instrument 2 with respect to the horizontal or the vertical can also be measured. Therefore, a distance, an elevation angle and the horizontal angle can be accurately measured with respect to the accurate measuring point (a point indicated by the lower end of the pole 18) regardless of the tilt of the target instrument 2. The measurement result is transmitted to the data collector 3.

Therefore, even in the measurement of a place where the target instrument 2 cannot be supported upright such as a corner of a wall, a corner of a ceiling or the like, for instance, an accurate measurement is possible if the measuring point can be indicated by using the lower end of the pole 18.

Next, a presence of the measuring point to be measured is confirmed (Step 10).

Even in a case where the target instrument 2 is moved to the next measuring point, by continuously executing the scanning pattern 85 even during the movement, a tracking of the target instrument 2 can be performed. According to the present embodiment, it is only necessary that the scanning pattern 85 crosses the linear reflection part 20 during the movement, and the tracking can be executed easily and reliably. Further, even if the tracking is discontinued due to an obstacle passing between the total station 1 and the target instrument 2 or the like, recovery can be made easily (Step 11).

It is to be noted that the tracking may be executed based on the image. If the target instrument 2 can be captured in the image, the search scan by the total station 1 can be performed, and thus, it is only necessary for the total station 1 to track so that the illumination light from the illuminating lamp 23 is captured in the image.

As described above, the target instrument 2 is captured by the image pickup unit 38, a rough direction is detected and the distance measuring optical axis 61 is directed to the direction obtained from the image. Therefore, the image pickup unit 38 functions as an object to be measured detection sensor.

Figure 12:
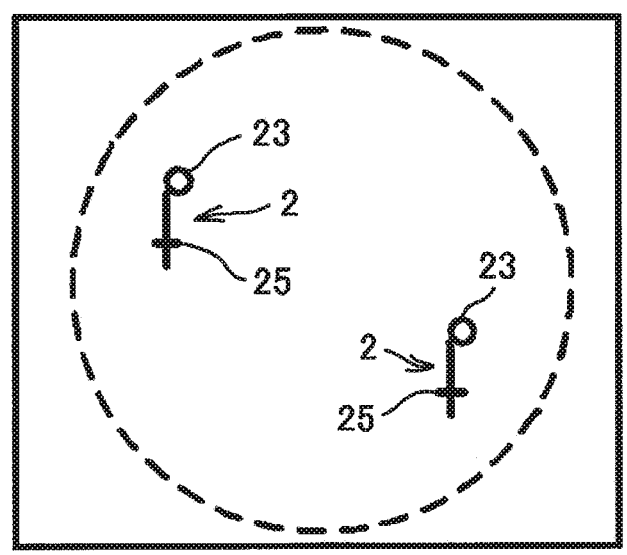
FIG. 12 is an explanatory drawing to show a case where a plurality of target instruments are included in an image.

Further, as shown in FIG. 12, the image pickup unit 38 has a wide field angle and can capture a plurality of the target instruments 2 existing over a wide range.

In a case where a plurality of the target instruments 2 exists in the field angle of the image pickup unit 38, by adding an identification function with respect to the individual target instruments 2, the distance measuring optical axis 61 can be sequentially directed (sighted) to the individual target instruments 2 by the optical axis deflector 62 based on the identified result.

In this case, only the distance measuring optical axis 61 is deflected without rotating the total station main body 7, that is, the reference optical axis O is in a fixed state. Thus, measurements can be executed continuously and substantially at the same time for the plurality of target instruments 2 by the total station 1.

Further, in a case where the field angle of the image pickup unit 38 is made equal to or substantially equal to the deflection angle by the optical axis deflector 62, with respect to the target instruments 2 and the measuring points, once the total station 1 is installed, measurements can be executed for all the target instruments 2 and all the measuring points existing in the measurement range (existing in the field angle of the image pickup unit 38) without changing the direction of the total station main body 7.

Further, the sighting of the total station 1 to each of the target instruments 2 (the reference reflection part 25) is based on the detection result of the image of the image pickup unit 38, the sighting direction is specified, and the sighting is executed instantaneously.

Next, the target instrument 2 will be further described.

Figure 13:
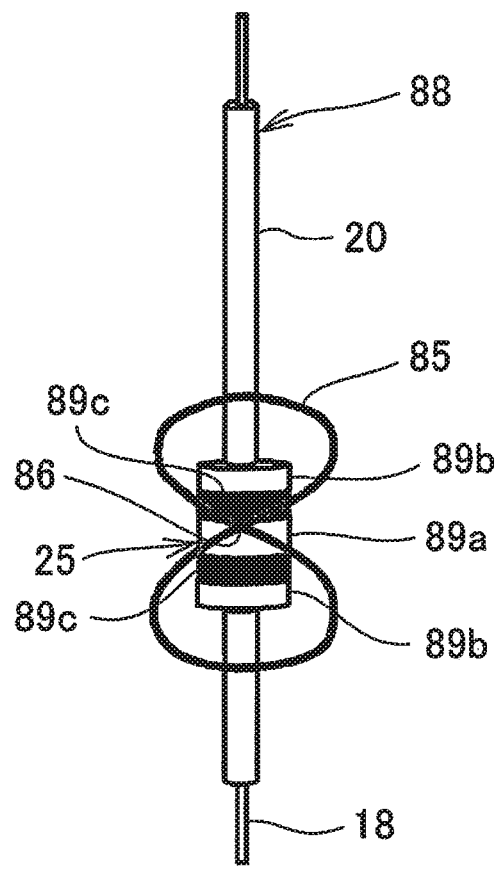
FIG. 13 is an explanatory drawing to show a second embodiment of the target instrument.

FIG. 13 shows a target instrument 88 which is a second embodiment. It is to be noted that in FIG. 13, the illuminating lamp 23 is omitted.

In the second embodiment, similarly to the target instrument 2 as shown in FIG. 9, a linear reflection part 20 is formed by winding a reflection sheet around an entire circumference of the pole 18. In the second embodiment, a reference reflection part 25, as provided at an intermediate part of the linear reflection part 20, is changed.

The reference reflection part 25 has a diameter larger than that of the pole 18, and further the reference reflection part 25 is divided into 5 equal parts along the axis in an up-and-down direction, and for each of a central part 89*a* and upper and lower parts 89*b* and 89*b*, the reflection sheet are wound around the entire circumference, respectively. Further, parts 89*c* and 89*c* adjacent in an up-and-down direction to the central part 89*a* are non-reflection parts. Further, a length of the central part 89*a* in an axial direction is larger than a beam diameter of a distance measuring light.

A center position of the central part 89*a* is a center position of the reference reflection part 25.

By forming the non-reflection parts 89*c* above and below the central part 89*a*, a boundary of the central part 89*a* can be detected, the center position of the central part 89*a* can be measured by measuring a boundary position, and an intersection 86 can be coincided with the center of the central part 89*a*.

Further, a diameter of the reference reflection part 25 is made the same as a diameter of the pole 18, and the non-reflection parts 89*c* and 89*c* may be formed above and below the central part 89*a*.

Figure 14:
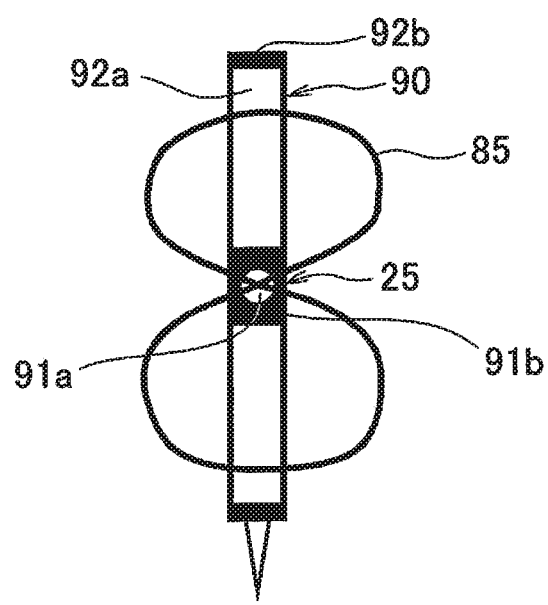
FIG. 14 is an explanatory drawing to show a third embodiment of the target instrument.

FIG. 14 shows a target instrument 90 which is a third embodiment. The target instrument 90 has a band-like flat-plate supporting member instead of a pole having a circular section. In FIG. 14, the illuminating lamp 23 is omitted.

A reference reflection part 25 indicating a reference point is constituted by a circular reflection sheet 91*a* and a non-reflection part 91*b* formed around the reflection sheet 91*a*. A center of the reference reflection part 25 indicates the reference point, and a distance from the center of the reference reflection part 25 to each of the upper and lower boundary lines of the non-reflection part 91*b* is already known, respectively. A band-like reflection sheet 92*a* is bonded to above and below the reference reflection part 25, and a periphery of the reflection sheet 92a is framed by the non-reflection part 92b.

A diameter of the reflection sheet 91a is set so as to be larger than a diameter of a distance measuring light, and a width dimension of the reflection sheet 92a is a known value.

Since the periphery of the reflection sheet 91a is surrounded by the non-reflection part 91b, a measurement of a boundary position of the reflection sheet 91a is made easy, and a detection of the center position of the reflection sheet 91a becomes easy. Further, since the periphery of the reflection sheet 92a is surrounded by the non-reflection part 92b, a measurement of a boundary position of the reflection sheet 92a is made easy, and a detection of a center line of the reflection sheet 92a becomes easy. A lower end portion of the target instrument 90 is designed as a tip so that the measuring point can be indicated.

Figure 15:
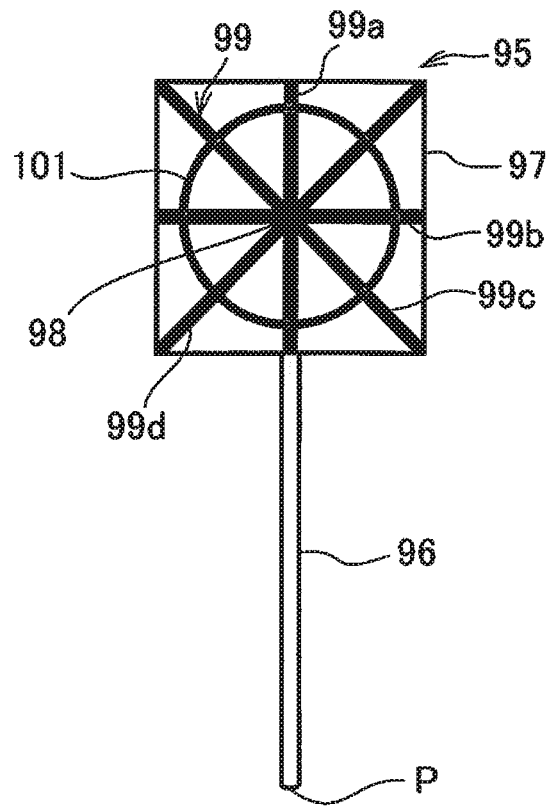
FIG. 15 is an explanatory drawing to show a fourth embodiment of the target instrument.

FIG. 15 shows a target instrument 95 which is a fourth embodiment.

In the target instrument 95, a reflecting plate 97 having a size containing a local scanning pattern is provided on an upper end of a pole 96.

A shape of the reflecting plate 97 may be either a regular square or a circle and may be any known shape. It is a regular square in the drawing, a center of the reflecting plate 97 is a reference point 98, the reference point 98 is on an axis of the pole 96, and a distance between a lower end of the pole 96 and the reference point 98 is already known.

An entire surface of the reflecting plate 97 is a reflection sheet, and further, a non-reflecting pattern 99 is formed.

The non-reflecting pattern 99 indicates a reference point, and the non-reflecting pattern 99 in FIG. 15 shows one example.

The non-reflecting pattern 99 is constituted by a vertical line 99a and a horizontal line 99b passing the reference point 98 and diagonal lines 99c and 99d passing the reference point 98, and the vertical line 99a, the horizontal line 99b and the diagonal lines 99c and 99d are non-reflection parts, respectively. The vertical line 99a, the horizontal line 99b and the diagonal lines 99c and 99d are each formed with a known line width, respectively, and may be the same line width or may have line widths different from each other, respectively.

Further, the non-reflecting pattern 99 may be any pattern in which the reference point 98 is indicated by non-reflective straight lines. Therefore, it would suffice if the pattern is constituted of two or more non-reflective straight lines which intersect and have known line widths and known inclinations.

As a two-dimensional scanning pattern in the fourth embodiment, various types of patterns such as a pattern of the shape of numeral 8, a circular scan pattern and the like can be used, but a circular scan pattern 101 is adopted in a description as given below. Further, it is assumed that the reflecting plate 97 is vertical and is faced with a total station 1.

As a method of approximately sighting a distance measuring optical axis 61 of the total station 1 at a center (the reference point 98) of the reflecting plate 97, as described above, a center of the reflecting plate 97 is detected from an image acquired by the image pickup unit 38, and the distance measuring optical axis 61 is directed toward an approximate center of the reflecting plate 97 based on this detection result.

When a search is executed by the circular scan pattern 101, since a distance measuring light is not reflected each time a scan line passes each line, that is, the vertical line 99a, the horizontal line 99b and the diagonal lines 99c and 99d, the reflected distance measuring light by the image pickup element 84 of the image pickup unit 38 is not detected, and a received light amount at a scan line passing position of each line is lowered.

Figure 16A:
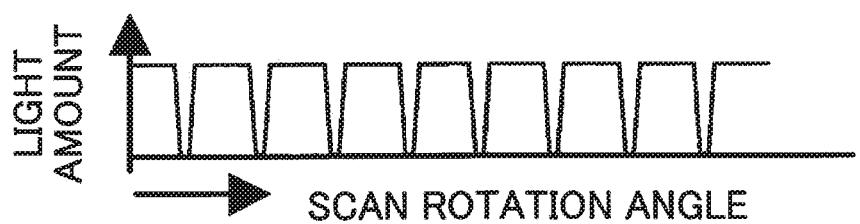

FIG. 16A shows a change in the received light amount on the scan line (circular scan line). In FIG. 16A, a position where the light amount is lowered indicate a position where the circular scan line passes each of the lines.

In the drawing, the positions where the light amounts are lowered are arranged at equal intervals, and the drawing shows that a center of the circular scan pattern 101 is coincided with the center (the reference point 98) of the non-reflecting pattern 99.

As a method of coinciding the center of the circular scan pattern 101 with the reference point 98, three-dimensional coordinates are acquired for two points where the circular scan pattern 101 passes the vertical line 99a, and further, a middle point of the vertical line 99a is acquired. Further, it is only necessary to similarly acquire a middle point also for the horizontal line 99b and adjust a sighting direction of the distance measuring optical axis 61 so that the coordinates of both the middle points coincide with each other.

Further, a middle point is similarly acquired for the diagonal lines 99c and 99d, and when the sighting direction of the distance measuring optical axis 61 is adjusted so that all the middle points are coincided, an accuracy of the sighting direction setting improves.

It is to be noted that the sighting direction may be adjusted so that the positions where the light amounts are lowered are arranged to be equal intervals.

Next, a description will be given on measurements of a tilt of the reflecting plate 97 (the tilt including a tilt in front-and-rear direction (hereinafter referred to as the "tilt") and a rotation around the pole 96 (hereinafter referred to as the "rotation")).

Figure 16B:
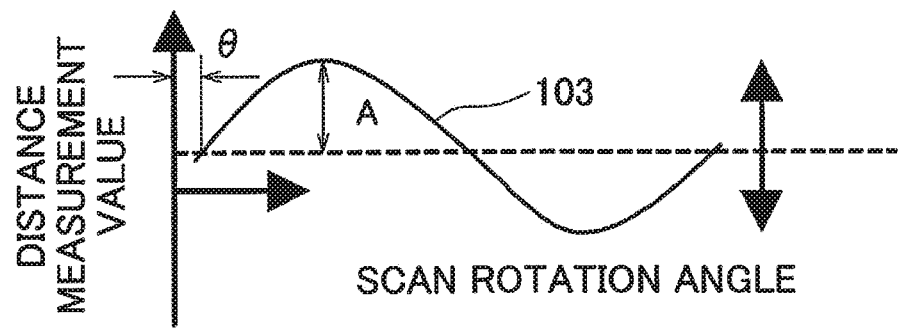

When the reflecting plate 97 is scanned by the distance measuring light in the circular scan pattern 101, a three-dimensional measurement is performed along the circular scan pattern 101. Under a condition where the reflecting plate 97 is tilted or rotated, since a distance measurement result is small at a position close to the total station 1, while the distance measurement result is large at a position distant from the total station 1, a sine curve 103 is acquired as shown in FIG. 16B, assuming that a rotation angle of the circular scan is a lateral axis.

The quantity of the tilt and the rotation appear as an amplitude A of the sine curve 103, and an angle of the rotation appears as a shift δ in a phase of the sine curve 103. Therefore, by measuring the amplitude A and the phase shift δ, the tilt and the rotation of the reflecting plate 97 can be detected.

Further, by correcting the distance measurement result of a measuring point P based on the detected tilt and rotation, a highly accurate measurement can be performed.

Since the total station main body 7 includes the attitude detector 41 and the attitude detector 41 can detect the attitude of the total station main body 7 in real time, it may be so configured that the total station main body 7 is removed from the installation base 6, the measurement is performed by the total station main body 7 under a condition where the total station main body 7 is held by hand, and the measurement result is corrected by the detection result of the attitude detector 41.

The invention claimed is:

1. A surveying system comprising: a total station and a target instrument,
wherein said target instrument has an object to be measured which is provided with a reflection sheet as a retro-reflector,
wherein said total station has a distance measuring light projecting unit for projecting a distance measuring light, a light receiving unit for receiving a reflected distance measuring light and producing a light receiving signal, a distance measuring unit for performing a distance measurement of an object to be measured based on said light receiving signal, an optical axis deflector provided on a distance measuring optical axis and capable of deflecting said distance measuring optical axis two-dimensionally, a projecting direction detecting module for detecting a deflection angle of said distance measuring optical axis and performing an angle measurement, and an arithmetic control module for controlling a deflecting action of said optical axis deflector and a distance measuring action of said distance measuring unit, wherein said arithmetic control module is configured to two-dimensionally scan said object to be measured with said distance measuring light by using said optical axis deflector, and to perform a distance measurement and an angle measurement with respect to two or more points on which distance measuring light crosses said object to be measured, and further to calculate three-dimensional coordinates of said two or more points based on results of the distance measurement and the angle measurement of said two or more points and to detect a tilt and a tilt direction of said target instrument based on said three-dimensional coordinates of said two or more points.

2. The surveying system according to claim 1, wherein said optical axis deflector comprises a pair of optical prisms rotatable around said distance measuring optical axis as a center and motors individually rotating said optical prisms independently, wherein said arithmetic control module is configured to control a rotating direction, a rotating speed and a rotation ratio of said pair of optical prisms and to control a deflection by said optical axis deflector and to two-dimensionally scan said distance measuring light passing through said optical axis deflector.

3. The surveying system according to claim 1, further comprising:
an attitude detector configured to detect a tilt of said total station relative to a horizontal,
wherein said arithmetic control module is configured to correct the distance measurement result and the angle measurement result of said object to be measured, based on a detection result from said attitude detector.

4. The surveying system according to claim 1, wherein said arithmetic control module is configured to detect said object to be measured based on the results of distance measurement and angle measurement while performing the two-dimensional scan, to direct said distance measuring optical axis toward said object to be measured by said optical axis deflector, to perform a distance measurement of said object to be measured and to obtain a three-dimensional coordinate of said object to be measured based on the distance measurement result and the angle measurement result by said projecting direction detecting module.

5. The surveying system according to claim 2, wherein said arithmetic control module is configured to control said optical axis deflector so as to form a two-dimensional scanning pattern, to detect a reflected distance measuring light when said two-dimensional scanning pattern crosses said object to be measured, to obtain a deflection angle of said distance measuring optical axis at the time of detecting said reflected distance measuring light by said projecting direction detecting module, to control said optical axis deflector such that a center of said two-dimensional scanning pattern is directed to said deflection angle, and to track said object to be measured.

6. The surveying system according to claim 1, wherein said object to be measured includes
a reference reflection part having a reference point,
an auxiliary reflection part provided adjacent to said reference reflection part,
the two-dimensional scan is a closed loop scanning pattern with a center position that coincides with said distance measuring optical axis, and
said arithmetic control module is configured to move said closed loop scanning pattern and to detect said reference reflection part based on a measurement result obtained by said closed loop scanning pattern.

7. The surveying system according to claim 6, wherein the shape of said closed loop scanning pattern can be changed, and
a scanning is executed by using a large closed loop scanning pattern in an initial search scan for detecting said object to be measured, and a scanning is executed by using a smaller local scanning pattern in a case of detecting said reference point of said reference reflection part.

8. The surveying system according to claim 6, wherein said arithmetic control module is configured to control said optical axis deflector to execute an initial search scan and a local search scan, wherein said initial search scan is a searching and scanning within a wide range of a maximum deflection angle of said optical axis deflector and said local search scan is a searching and scanning of a narrower range, including said object to be measured, than said initial search scan,
wherein said arithmetic control module is configured to control said optical axis deflector to shift to said local search scan when detecting said reflected distance measuring light from said object to be measured by said initial search scan.

9. The surveying system according to claim 5, wherein said total station further comprises: a total station main body, a horizontal rotary unit and a vertical rotary unit, wherein said arithmetic control module is configured to horizontally rotate and vertically rotate said total station main body by said horizontal rotary unit and said vertical rotary unit in such a manner that a center of said scanning pattern directs to a direction in which said reflected distance measuring light is detected.

10. The surveying system according to claim 1, wherein said target instrument includes a pole,
a reference reflection part having a greater diameter than said pole is provided at a predetermined position of said pole, and
said reference reflection part is wound by a reflection sheet such that an entire circumference of said reference reflection part is covered,
an auxiliary reflection part is formed by winding said pole with a reflection sheet such that an entire circumference of said pole is covered.

11. The surveying system according to claim 10, wherein a non-reflection part is formed at a boundary between said reference reflection part and said auxiliary reflection part.

12. The surveying system according to claim 1, wherein said target instrument includes a band-like flat-plate,
said reference reflection part is provided at a predetermined position of said flat-plate,
said reference reflection part is formed of a circular reflection sheet with a reference point as a center and a non-reflection part formed around said reflection sheet, and
an auxiliary reflection part is provided adjacent to said reference reflection part.

13. The surveying system according to claim 7, wherein said target instrument has a reflecting plate having a size in which said local scanning pattern is included,
a reflection sheet is provided across an entire surface of said reflecting plate, and
at least two or more non-reflective straight lines that intersect at a reference point are furthermore formed on said reflecting plate.

14. The surveying system according to claim 6, wherein said arithmetic control module is configured to detect a tilt angle and a tilt direction of said target instrument based on a measurement result obtained from said auxiliary reflection part in the two-dimensional scan.

15. The surveying system according to claim 13, wherein the two-dimensional scan is a circular scan pattern, and said arithmetic control module is configured to determine a tilt of said target instrument based on an amplitude of a sine curve obtained from a distance measurement result of said circular scan pattern, and to determine a rotation of said target instrument based on a shift in a phase of said sine curve.

16. The surveying system according to claim 8, wherein said total station further comprises: a total station main body, a horizontal rotary unit and a vertical rotary unit, wherein said arithmetic control module is configured to horizontally rotate and vertically rotate said total station main body by said horizontal rotary unit and said vertical rotary unit in such a manner that a center of said scanning pattern directs to a direction in which said reflected distance measuring light is detected.

17. A surveying system comprising: a total station and a target instrument,
wherein said target instrument has an object to be measured which is provided with a reflection sheet as a retro-reflector,
wherein said total station has a distance measuring light projecting unit for projecting a distance measuring light, a light receiving unit for receiving a reflected distance measuring light and producing a light receiving signal, a distance measuring unit for performing a distance measurement of an object to be measured based on said light receiving signal, an optical axis deflector provided on a distance measuring optical axis and capable of deflecting said distance measuring optical axis two-dimensionally, a projecting direction detecting module for detecting a deflection angle of said distance measuring optical axis and performing an angle measurement, and an arithmetic control module for controlling a deflecting action of said optical axis deflector and a distance measuring action of said distance measuring unit, wherein said arithmetic control module is configured to two-dimensionally scan said object to be measured with said distance measuring light by using said optical axis deflector and to perform a distance measurement and an angle measurement with respect to said object to be measured, and further to detect a tilt and a tilt direction of said target instrument based on two or more results of distance measurement and angle measurement,
wherein said object to be measured includes
a reference reflection part having a reference point,
an auxiliary reflection part provided adjacent to said reference reflection part,
the two-dimensional scan is a closed loop scanning pattern with a center position that coincides with said distance measuring optical axis, and
said arithmetic control module is configured to move said closed loop scanning pattern and to detect said reference reflection part based on a measurement result obtained by said closed loop scanning pattern,
wherein the shape of said closed loop scanning pattern can be changed, and
a scanning is executed by using a large closed loop scanning pattern in an initial search scan for detecting said object to be measured, and a scanning is executed by using a smaller local scanning pattern in a case of detecting said reference point of said reference reflection part,
wherein said target instrument has a reflecting plate having a size in which said local scanning pattern is included,
a reflection sheet is provided across an entire surface of said reflecting plate, and
at least two or more non-reflective straight lines that intersect at a reference point are furthermore formed on said reflecting plate.

18. The surveying system according to claim 17, wherein the two-dimensional scan is a circular scan pattern, and said arithmetic control module is configured to determine a tilt of said target instrument based on an amplitude of a sine curve obtained from a distance measurement result of said circular scan pattern, and to determine a rotation of said target instrument based on a shift in a phase of said sine curve.

* * * * *